US012643810B2

(12) United States Patent
Peuchert et al.

(10) Patent No.: US 12,643,810 B2
(45) Date of Patent: Jun. 2, 2026

(54) PRESSURE SENSOR, GLASS WAFER AND PRODUCTION METHOD

(71) Applicant: SCHOTT AG, Mainz (DE)

(72) Inventors: Ulrich Peuchert, Bodenheim (DE); Christoph Hindriksen, Hildesheim (DE); Alexander Glacki, Hannover (DE); Thomas Wiegel, Alfeld (DE); Andreas Langsdorf, Ingelheim am Rhein (DE); Frank Büllesfeld, Kriftel (DE); Matthias Jotz, Mainz am Rhein (DE); Mohd Sairul Nizam Omar, Sungai Petani (MY); Jonathan Leon Ruckes, Mainz (DE)

(73) Assignee: SCHOTT AG, Mainz (DE)

( * ) Notice: Subject to any disclaimer, the term of this patent is extended or adjusted under 35 U.S.C. 154(b) by 199 days.

(21) Appl. No.: 18/464,225

(22) Filed: Sep. 10, 2023

(65) Prior Publication Data

US 2023/0416134 A1      Dec. 28, 2023

Related U.S. Application Data

(63) Continuation of application No. PCT/EP2022/056246, filed on Mar. 10, 2022.

(30) Foreign Application Priority Data

Mar. 10, 2021    (DE) ..................... 10 2021 105 758.2

(51) Int. Cl.
C03B 17/06 (2006.01)
B24B 7/24 (2006.01)
(Continued)

(52) U.S. Cl.
CPC ........... C03B 17/064 (2013.01); B24B 7/241 (2013.01); C03B 5/225 (2013.01); G01L 9/06 (2013.01)

(58) Field of Classification Search
CPC ....... C03B 17/064; C03B 5/225; B24B 7/241; G01L 9/06
See application file for complete search history.

(56) References Cited

U.S. PATENT DOCUMENTS

| 4,576,571 | A | 3/1986 | Moufflet |
| 2007/0066066 | A1 | 3/2007 | Kojima |
(Continued)

FOREIGN PATENT DOCUMENTS

| DE | 102009046229 | 5/2011 |
| DE | 102016107934 | 11/2017 |
(Continued)

OTHER PUBLICATIONS

ASTM E1461-01, "Standard Test Method for Thermal Diffusivity by the Flash Method", May 2001.
(Continued)

*Primary Examiner* — Travis M Figg
(74) *Attorney, Agent, or Firm* — Ruggiero McAllister & McMahon LLC

(57) ABSTRACT

A glass article is provided that has two plane-parallel main sides, a thickness between the two plane-parallel main sides of less than 3.0 mm, an average near-surface level of damage (ONSL) on each of the two plane-parallel main sides, and an average location-thickness variation (ODS) normalized with respect to the thickness on the specified measuring area. The average near-surface level of damage is less than 2000 damages with an extension of less than 1.0 µm. The specified measuring area is 2×2 mm². The average location-thickness variation (ODS) normalized is less than 10 nm per µm thickness of the glass article. The average location-thickness variation (ODS) is a difference between a highest thickness and a lowest thickness within the specified measuring area.

15 Claims, 4 Drawing Sheets

(51) Int. Cl.
    *C03B 5/225*       (2006.01)
    *G01L 9/06*         (2006.01)

(56)             References Cited

U.S. PATENT DOCUMENTS

| | | | | |
|---|---|---|---|---|
| 2012/0279310 | A1* | 11/2012 | Kober | G01L 9/0042 |
| | | | | 73/717 |
| 2016/0152507 | A1* | 6/2016 | Brown | B25B 11/005 |
| | | | | 269/21 |
| 2017/0338428 | A1* | 11/2017 | Loeffelbein | C03C 3/087 |
| 2021/0269347 | A1* | 9/2021 | Zimmer | C03B 17/064 |
| 2021/0347670 | A1* | 11/2021 | Lenz | C03C 3/087 |

FOREIGN PATENT DOCUMENTS

| | | | | |
|---|---|---|---|---|
| DE | 102016115297 | | 2/2018 | |
| JP | 2016102039 | | 6/2016 | |
| KR | 20070022231 | | 2/2007 | |
| KR | 20160024940 | A * | 3/2016 | ......... C03B 33/0215 |
| WO | 2020076604 | A1 | 4/2020 | |
| WO | 2020104497 | | 5/2020 | |

OTHER PUBLICATIONS

DIN ISO 7884-2, "Viscosity and viscometric fixed points Part 2: Determination of viscosity with rotational viscometers", Feb. 1998.
DIN ISO 7991, "Glass—Determination of coefficient of mean linear thermal expansion", Dec. 15, 1987.
International Search Report and Written Opinion dated Jun. 22, 2022 for International Patent Application No. PCT/EP2022/056246.
International Preliminary Report on Patentability dated Sep. 12, 2023 for International Patent Application No. PCT/EP2022/056246.

* cited by examiner

PRESSURE SENSOR, GLASS WAFER AND PRODUCTION METHOD

CROSS REFERENCE TO RELATED APPLICATIONS

This application is continuation of International Application PCT/EP2022/056246 filed Mar. 10, 2022, which claims benefit of German Application 10 2021 105 758.2 filed Mar. 10, 2021, the entire contents of all of which are incorporated herein by reference.

BACKGROUND

1. Field of the Invention

The present invention relates to a glass article as well as its use in a pressure sensor. The invention also relates to a method for the production of the glass article.

2. Description of Related Art

In the course of advancing digitalization, intelligent and networked systems that rely on sensor data are increasingly being used. Improved analysis methods, e.g., using artificial intelligence, allow the evaluation of large amounts of data and open up new possibilities to use also small changes of measuring values for the automation and control. To further advance this development, more and more accurate sensors are desirable. Examples of such sensors are pressure sensors.

Pressure sensors are used in many fields, in particularly for controlling machines and industrial plants, for example in the production of food or the petrochemical industry. Also in the automotive field, for example for the measurement of oil and tire inflation pressure, pressure sensors are used.

Microelectromechanical (or MEMS) pressure sensors comprise a thin membrane made of silicon which can elastically be deformed by pressure. This silicon membrane is usually mounted on a base made of an insulator or a semiconducting material, for example silicon. The base comprises an opening through which a fluid, such as for example a gas, can enter the measuring cavity of the pressure sensor. Here, pressures act on the membrane from both sides, a defined or also variable reference pressure on the one side as well as a variable pressure on the side of the membrane facing the measuring cavity. There are also sensors which operate without reference pressure, i.e., the reference pressure can be variable. When the pressures on the two sides of the membrane differ from each other, then the membrane is deformed. Measuring resistors are incorporated in the membrane which change their resistance, when deformed (so-called piezoresistive resistors). They are arranged electrically in the form of a so-called Wheatstone bridge circuit. A deformation of the membrane results in a change of the electrical voltage of the bridge circuit. This measurable change of the bridge voltage is approximately proportional to the pressure difference.

It would be desirable to have pressure sensors with a better measuring accuracy.

SUMMARY

In an aspect, the invention relates to a glass article having a thickness of less than 3.0 mm with an average near-surface level of damage (ONSL) on 2×2 mm$^2$ of less than 2000 damages and/or an average location-thickness variation (ODS) normalized with respect to the thickness on 2×2 mm$^2$ of less than 10 nm per μm thickness, wherein the ODS is the difference between the highest thickness and the lowest thickness within the specified measuring area.

Glass articles of this invention are suitable for the use as component part in pressure sensors. One function of such glass component parts is the thermal decoupling of the membrane used for the measurement from a base material and the environment. The more accurate the desired measurement, the more important is a good and, first and foremost, uniform thermal decoupling. Also pressure sensors are subject to a trend toward miniaturization. The component parts are becoming smaller and smaller and thinner and thinner. One advantage of glass is that it can be manufactured in a particularly low thickness with good surface quality. However, the smaller the pressure sensor as a whole, the greater the impact of even small deviations. Even the effect of certain vibration frequencies onto the glass during the shaping, e.g., in the down draw method, can lead to thickness fluctuations on a small area, which contribute to local deviations in heat transfer.

In the handling and the post-processing of glass articles, e.g., polishing, grinding, lapping, small damages can be introduced into the glass, which penetrate amazingly deep into the glass. Due to the very low thickness of the glass articles which are used in the pressure sensors, cracks of a few micrometers in depth can already have a considerable influence onto the properties of the glass article, including its heat transfer.

Thickness fluctuations, cavities, cracks and similar impairments can compromise the connection of glass articles with other component parts of a pressure sensor. For example, the sticking together of component parts may become more difficult or require more adhesive for compensating unevenness or cracks. The use of additional adhesive or inorganic frit in turn compromises the uniformity of the thermal decoupling.

The provision of glass articles according to the present invention can be achieved, for example, when certain measures are taken in the shaping of the glass and optionally the surface treatment. For example, it has been proved to be beneficial, when certain sections during the drawing process are kept free from vibrations in the frequency range of 0.01 to 500 Hz, for example 0.05 to 400 Hz, 0.1 to 300 Hz, 0.5 to 250 Hz, 0.8 to 200 Hz, 1 to 100 Hz, 4 to Hz or 5 to 50 Hz. Preferably, certain sections during the drawing process are kept free from vibrations with a frequency of at least 0.01 Hz, at least 0.05 Hz, at least 0.1 Hz, at least Hz, at least 0.8 Hz, at least 1 Hz, at least 4 Hz or at least 5 Hz. Preferably, certain sections during the drawing process are kept free from vibrations with a frequency of at most 500 Hz, at most 400 Hz, at most 300 Hz, at most 250 Hz, at most 200 Hz, at most 100 Hz, at most 75 Hz or at most 50 Hz. In the surface treatment, it may be reasonable to comply with certain parameters described herein with regard to the grain size used.

In an aspect, the invention relates to the use of here described glass articles as component part in a pressure sensor. For example, the glass article can be used for component parts which serve for the thermal decoupling of measuring membranes.

The glass article can be used for pressure sensors which allow a higher measuring accuracy. For the use in pressure sensors the glass article may be perforated. The solution is based on the idea that for a high measuring accuracy the thermal decoupling of the silicon membrane of a pressure sensor from the medium to be measured should be as uniform as possible. It has been found that for a uniform thermal decoupling the variables location-thickness variation (ODS) and near-surface level of damage (ONSL) are important. With suitable measures in the production such glass articles can be obtained.

In an aspect, the invention relates to a method for the production of glass articles, comprising the steps: producing of a glass melt, refining of the glass melt, drawing of the glass melt, in particularly using drawing rolls, to a glass ribbon having a target thickness in the range of less than 3.0 mm, dividing of the glass ribbon into glass articles, wherein the glass ribbon passes a region Z in which it exceeds the target thickness by less than 10%, but its viscosity is still less than $10^{10}$ dPas, wherein the glass in the region Z is drawn with a drawing speed of at least 0.5 m/min and at most 50 m/min, for example 2 to 10 m/min, 10 to m/min or 25 to 50 m/min, and wherein measures are taken which are suitable for keeping the region Z free from interfering influences in the frequency range of 0.01 to 500 Hz, for example 0.05 to 400 Hz, 0.1 to 300 Hz, 0.5 to 250 Hz, 0.8 to 200 Hz, 1 to 100 Hz, 4 to 75 Hz or 5 to 50 Hz.

The glass can, for example, be drawn in the region Z with a drawing speed of at least m/min, at least 2 m/min, at least 10 m/min or at least 25 m/min. It can be drawn in the region Z, for example, with a drawing speed of at most 50 m/min, at most 25 m/min or at most 10 m/min.

For example, measures can be taken which are suitable for keeping the region Z free from interfering influences with a frequency of at least 0.01 Hz, at least 0.05 Hz, at least 0.1 Hz, at least 0.5 Hz, at least 0.8 Hz, at least 1 Hz, at least 4 Hz or at least 5 Hz. For example, measures can be taken which are suitable for keeping the region Z free from interfering influences with a frequency of at most 500 Hz, at most 400 Hz, at most 300 Hz, at most 250 Hz, at most 200 Hz, at most 100 Hz, at most 75 Hz or at most 50 Hz.

In particular, frequencies of 1 Hz or more have been found to be associated with emergence of relevant location-thickness variations. Therefore, measures should be taken which are suitable for keeping the region Z free from interfering influences in the frequency range of 1 to 500 Hz, 2 to 400 Hz, 3 to 300 Hz, 4 to 250 Hz, 5 to 200 Hz, 10 to 100 Hz, 15 to Hz or 20 to 50 Hz. For example, measures can be taken which are suitable for keeping the region Z free from interfering influences with a frequency of at least 1 Hz, at least 2 Hz, at least 3 Hz, at least 4 Hz, at least 5 Hz, at least 10 Hz, at least 15 Hz, or at least 20 Hz. For example, measures can be taken which are suitable for keeping the region Z free from interfering influences with a frequency of at most 500 Hz, at most 400 Hz, at most 300 Hz, at most 250 Hz, at most 200 Hz, at most 100 Hz, at most 75 Hz or at most 50 Hz.

Drawing of the glass melt may in particular include down draw or overflow fusion. In both cases the glass melt emerges from a tank and is then drawn to a glass ribbon. The viscosity that the glass melt has at the point at which it emerges from the tank is relevant with respect to the emergence of location-thickness variations. Notably, the viscosity should not be too high in order for the glass melt to be properly drawn. However, if the viscosity is too low, the glass ribbon is going to be too long in a viscosity range that makes it susceptible for developing location-thickness variations during drawing. Therefore, the viscosity at which the glass melt emerges from the tank should be $10^{2.20}$ dPas or more, $10^{2.30}$ dPas or more, $10^{2.40}$ dPas or more, $10^{2.50}$ dPas or more, $10^{2.60}$ dPas or more, $10^{2.70}$ dPas or more, $10^{2.80}$ dPas or more, $10^{2.90}$ dPas or more, $10^{3.00}$ dPas or more, $10^{3.10}$ dPas or more, $10^{3.20}$ dPas or more, or $10^{3.30}$ dPas or more. The viscosity at which the glass melt emerges from the tank may for example be at most $10^{4.00}$ dPas, at most $10^{3.90}$ dPas, at most $10^{3.80}$ dPas, at most $10^{3.70}$ dPas, at most $10^{3.60}$ dPas, or at most $10^{3.50}$ dPas. The viscosity at which the glass melt emerges from the tank may for example be in a range of from $10^{2.20}$ dPas to $10^{4.00}$ dPas, from $10^{2.30}$ dPas to $10^{4.00}$ dPas, from $10^{2.40}$ dPas to $10^{3.90}$ dPas, from $10^{2.50}$ dPas to $10^{3.90}$ dPas, from $10^{2.60}$ dPas to $10^{3.80}$ dPas, from $10^{2.70}$ dPas to $10^{3.80}$ dPas, from $10^{2.80}$ dPas to $10^{3.70}$ dPas, from $10^{2.90}$ dPas to $10^{3.70}$ dPas, from $10^{300}$ dPas to $10^{3.60}$ dPas, from $10^{3.10}$ dPas to $10^{3.60}$ dPas, from $10^{3.20}$ dPas to $10^{3.50}$ dPas, or from $10^{3.30}$ dPas to $10^{3.50}$ dPas.

In the down draw process, the tank has an elongated nozzle from which the glass melt flows and emerges downwards. The point at which the glass melt emerges from the tank is given by the nozzle opening or by the end of a blade inserted in the nozzle, at which blade the glass runs down. In the overflow fusion process, this point is given by the tank bottom side at which the glass streams meet, combine and flow downwards.

It is also advantageous if the viscosity increases steeply after emerging from the tank. The steepness of the viscosity increase can be influenced by the choice of the glass composition and/or by applying a suitable cooling regimen.

BRIEF DESCRIPTION OF THE DRAWINGS

FIGS. 3A and 3B shows images of samples according to Examples 1A and 1B of the near-surface level of damage (ONSL)

DETAILED DESCRIPTION

Figure 1:
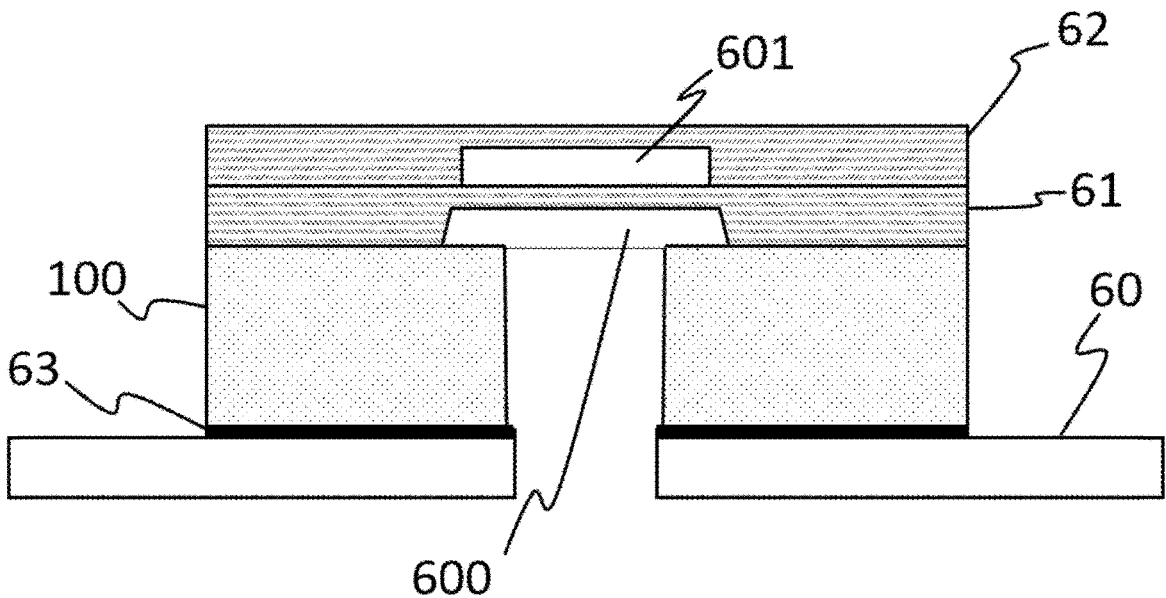
FIG. 1 shows an exemplary embodiment of a pressure sensor according to the present disclosure.

Thin glass articles are suitable as component parts for pressure sensors. An exemplary structure of such a pressure sensor is shown in FIG. 1. A membrane is deformed depending on the applied pressure. The deformation and thus the pressure is measured via the change of the resistance of piezoresistive elements on the membrane.

The near-surface level of damage (ONSL) describes the extent of superficial damages of a surface of a glass article. "Damages" are volumes having an extension of at least 1.0 μm which are not filled with glass, but due to scratches, grooves, striae, gas inclusions, spallings, conchoidal fractures or the like are present as open or closed cavities in the glass article. The "extension" of a damage is its largest diameter. The "extension" of a damage can also be referred to as "length" of the damage. The "width" of a damage means the diameter of the damage in the orthogonal direction with respect to the length of the damage. "Superficial" means in this context that the damages at least in sections reach the surface of the article or that they at least in sections are no more than 1.0 μm below its surface. A section of the surface of the glass article is free of damages, when it does not comprise any damage, i.e., no damage at the surface and no damage in a depth of down to 1.0 μm below the surface.

The ONSL can be specified in % as area coverage ONSL, and then it is the area portion of the considered surface section which comprises damages. When in the present disclosure reference is made to the ONSL, then, unless otherwise stated, not the area coverage ONSL is meant, but the numerical ONSL which specifies the number of near-surface damages based on an area section of certain size, normally based on an area section of 2×2 mm².

The average ONSL on a certain area section is in particularly determined by determining the number of the near-surface damages in several different test regions and subsequently calculating an average value from this. The area of the examined regions has not to be the same as the area of the area section which is specified as the basis of the ONSL. When, for example, the ONSL is specified based on an area section of 2×2 mm², then the number of the near-surface damages can be determined in test regions, the area of which is different from 2×2 mm². In particularly it is possible that the area of the individual test regions and/or the total area of the test regions is smaller than 2×2 mm². In embodiments of the invention, the area of the individual test regions is, for example, at least 0.05 mm², at least 0.1 mm² or at least 0.15 mm². The total area of the test regions may, for example, be at least 0.2 mm², at least 0.5 mm², at least 0.7 mm² or at least 1.0 mm². In embodiments of the invention, the test regions are arranged in a uniformly distributed manner. In particularly, the individual test regions may be equally spaced from each other and/or from the edge of the glass article. For example, when four or nine test regions are examined, then they may be arranged in the form of a square. In the case of nine test regions, the test region located in the center of the square of course does not have the same distance to the edge. The same distance to the edge applies in particularly to the test regions lying on the outside. The test regions can also be arranged in the form of a rectangle or a circle. The shape of the arrangement of the test regions can correspond in particularly to the shape of the two main sides. A substantially uniform distribution of the test regions is advantageous for determining a particularly representative ONSL.

The ONSL can be determined by means of a microscope, in particularly with fortyfold magnification, preferably with a confocal laser scanning microscope, in particularly Zeiss LSM 800.

The calculation of the average ONSL will be explained with the help of an example. It is assumed that for a glass article the average ONSL based on an area section of 2×2 mm² has to be determined. For this purpose, in a number of test regions, normally between two and ten (for example seven), the number of the near-surface damages can be determined each. The area of the individual test regions can, for example, be between 0.1 mm² and 0.2 mm². When, for example, ten test regions with an area of 0.1 mm² each are examined, and when in sum on the whole 200 near-surface damages are detected, then the average ONSL is 200 damages per mm² or in other words 800 damages on an area section of 2×2 mm².

In an alternative or in addition to the average ONSL it is also possible to specify the maximum near-surface level of damages ($ONSL_{max}$). When, for example, in the above-described example in one of the ten test regions 40 near-surface damages are detected and when this number is the highest of all ten test regions, then $ONSL_{max}$ can be calculated as the product of the number of the damages and the quotient of the area content of the area section onto which the $ONSL_{max}$ should be based and the area content of the test region. Thus, in the present example, it is as follows:

$$ONSL_{max} = 40 \text{ damages} \cdot \frac{2 \times 2 \text{ mm}^2}{0.1 \text{ mm}^2} = 1600 \text{ damages on } 2 \times 2 \text{ mm}^2$$

The ONSL has to be distinguished from the roughness of the surface. The roughness of a surface describes substantially smaller structures in the surface, wherein the extensions of them are considerably below 1.0 μm. Exemplary roughness is typically less than 5 nm for polished/processed glasses and even lower for hot-shaped surfaces. The glass article may, for example, have a roughness $R_a$ of less than 2 nm, in particularly on an area section of 2×2 mm² or of 5×5 mm², particularly preferably on the whole surface of one or both main sides of the glass article.

Advantageous is in particularly an average ONSL on an area section of 2×2 mm² of less than 2000, for example at most 1500, at most 1250, at most 1000, at most 750, at most 500, at most 400, at most 300, at most 200, at most 150, at most 125, at most 100, at most 90, at most 80, at most 70, at most 60 or at most 50 damages. The average ONSL on an area section of 2×2 mm² may, for example, be at least 1, at least 2, at least 5, at least 10 or at least damages.

Advantageous is in particularly an $ONSL_{max}$ on an area section of 2×2 mm² of at most 4000, for example at most 3000, at most 2500, at most 2000, at most 1500, at most 1000, at most 800, at most 600, at most 400, at most 300, at most 250, at most 200, at most 180, at most 160, at most 140, at most 120 or at most 100 damages. The $ONSL_{max}$ on an area section of 2×2 mm² may, for example, be at least 2, at least 4, at least 10, at least 20 or at least 40 damages.

The glass article has a low thickness of less than 3.0 mm. In preferred embodiments, it is even more considerably thinner, wherein in particularly the article can have a thickness of less than 2.0 mm, less than 1.0 mm or than 500 μm. In certain embodiments, the article even has a thickness of less than 350 μm, less than 250 μm, less than 150 μm, less than 100 μm or less than 50 μm. Particularly thin glass articles have—besides the reduction of the thickness as a contribution to miniaturization—the advantage that they only slightly contribute to the weight of the pressure sensor. Especially in the automotive field or in portable electronic devices a low weight is important. But very thin glasses are also more challenging with regard to handling. For example, in the case of very thin glasses damages can occur very easily, and the instrument-based effort required for processing very thin glasses is high. In some embodiments, the thickness of the glass article is higher than 5.0 μm, preferably even higher than 10.0 μm or higher than 20.0 μm. Particularly preferred glass articles of the invention have a thickness of more than 250 μm, for example at least 300 μm, at least 350 μm, at least 400 μm, at least 450 μm, or at least 500 μm. The thickness may for example be in a range of from >250 μm to <3.0 mm, from 300 μm to 2.75 mm, from 350 μm to 2.5 mm, from 400 μm to 2.25 mm, from 450 μm to 2.0 mm, or from 500 μm to 1.5 mm. The thickness may for example be at most 2.75 mm, at most 2.5 mm, at most 2.25 mm, at most 2.0 mm, at most 1.5 mm, or at most 1.0 mm.

Accordingly, the glass article is preferably a flat item in the form of a plate, a disc, a wafer, a sheet or the like. The article has in particularly two main sides having the largest extension in comparison to the other sides of the article. The shortest distance between these two sides corresponds to the thickness of the glass article. The two main sides are in particularly plane-parallel.

Preferably, the ONSL described here applies at least in sections to both main sides of the glass article. When in this description for an area section of the glass article an ONSL is specified, then this value preferably also applies to the corresponding area section on the opposite main side of the glass article.

Portable technical devices are becoming smaller and smaller and require a packing or integration density which is as high as possible. The same applies to automobiles: the available space for pressure sensor modules and systems is getting smaller and smaller (example: in-valve pressure sensors for the measurement of the tire inflation pressure). These trends reinforce the development towards smaller component parts. This also applies to pressure sensors. For obtaining a high measuring accuracy it is necessary that the quality of the glass article, in particularly with respect to ONSL and/or ODS, is achieved on an area which is sufficient for the production of pressure sensors. Preferably, this area is $2 \times 2$ mm$^2$ or more, in particularly $4 \times 4$ mm$^2$ or more, for example $5 \times 5$ mm$^2$ or more.

The glass article itself can be considerably larger. Typically, the glass article can have a size of at least 100 mm$^2$, at least 200 mm$^2$, at least 400 mm$^2$, at least 600 mm$^2$, at least 800 mm$^2$, at least 2000 mm$^2$ (in particularly diameter 2 inch (approximately 50 mm)), at least 4400 mm$^2$ (in particularly diameter 3 inch (approximately 75 mm)) and/or at least 74000 mm$^2$ (in particularly diameter 12 inch (approximately 300 mm)). From such a large glass article a great number of component parts for the production of pressure sensors can be prepared, e.g., by sawing out (dicing) of component parts from the glass article. Also larger and also smaller sheets or wafers than mentioned above can be used. The glass article may have a round or cornered base area.

In a preferred embodiment, the glass article has a size of at least 100 mm$^2$, for example at least 200 mm$^2$, at least 400 mm$^2$, at least 600 mm$^2$, at least 800 mm$^2$, at least 2000 mm$^2$ (in particularly diameter 2 inch (approximately 50 mm)), at least 4400 mm$^2$ (in particularly diameter 3 inch (approximately 75 mm)) and/or at least 74000 mm$^2$ (in particularly diameter 12 inch (approximately 300 mm)). With the "size" of the glass article in particularly the area content of one of both main sides of the article is meant. In particularly, both main sides of the article have the same area content.

In an embodiment, the glass article may comprise at least 30 area sections having a size of $2 \times 2$ mm$^2$, in particularly at least 40 or at least 45 area sections to which the values here described, in particularly ONSL and/or ODS, apply. Such a glass article is suitable for a particularly economic production of component parts for pressure sensors. In an embodiment, the area portion of the glass article which fulfils the parameters ONSL and/or ODS is at least at least 60.0%, at least 70.0%, at least 80.0%, at least 90.0%, at least 95.0%, at least 98.0%, at least 99.0% or at least 99.9% of the whole area of the glass article. In an embodiment, the average ONSL and/or the ONSL$_{max}$ are substantially fulfilled on the whole area of each of both main sides, in particularly on about 100% of the area of each of both main sides. In an embodiment, ODS$_{avg}$, ODS$_{max}$ and/or the ODS normalized with respect to the thickness are substantially fulfilled on the whole area of the glass article, in particularly on about 100% of the area.

The location-thickness variation (ODS) describes the difference between the highest thickness measured a and the lowest thickness measured b within an area section of the glass article. The following applies: ODS$_i$=a$_i$–b$_i$ with i=1, 2, . . . , n (n=number of the area sections of the glass article). The maximum location-thickness variation (ODS$_{max}$) of a glass article is the highest of the ODS$_i$ values of this glass article. The minimum location-thickness variation (ODS$_{min}$) of a glass article is the lowest of the ODS$_i$ values of this glass article. The average location-thickness variation (ODS$_{avg}$) of a glass article is the mean value of the ODS$_i$ values of this glass article. In the present disclosure often ODS$_{avg}$ is abbreviated and referred to as ODS. When in the present disclosure it is referred to ODS, then ODS$_{avg}$ is meant, unless otherwise stated.

For the measurements, for example, an interferometer can be used, in particularly a Precitec Sensor Interferometric-K interferometer. The sampling rate may in particularly be 4 kHz. The scanning speed may in particularly be 500 mm/s. The measuring point interval may in particularly be 0.125 mm.

The ODS can be specified normalized with respect to the thickness, thus based on the average thickness of the considered area section or on the average thickness of the glass article or on the nominal thickness of the glass article. Deviations between the average thickness of the glass article and the nominal thickness of the glass article can normally be neglected. Therefore, the nominal thickness is a good measure for the average thickness of the glass article and is preferably used for the normalization of the thickness.

Advantageous is in particularly an ODS normalized with respect to the thickness of less than 10 nm per µm thickness of the glass article. The ODS normalized with respect to the thickness of less than 10 nm per µm thickness of the glass article is preferably achieved on an area section of $2 \times 2$ mm$^2$ or more, in particularly on an area section of $4 \times 4$ mm$^2$ or more or even on an area section of $5 \times 5$ mm$^2$ or more. Preferably, the ODS normalized with respect to the thickness on an area section of $2 \times 2$ mm$^2$ is less than 5 nm/µm or less than 2 nm/µm. Further preferably, the ODS normalized with respect to the thickness on an area section of $5 \times 5$ mm$^2$ is less than 5 nm/µm or less than 2 nm/µm. Depending on the production method, a certain ODS normalized with respect to the thickness cannot always be avoided so that the glass article in an embodiment may have an ODS normalized with respect to the thickness of nm/µm or higher, for example of at least 0.01 nm/µm or at least 0.05 nm/µm, in particularly on an area section of $2 \times 2$ mm$^2$ or more, for example $5 \times 5$ mm$^2$. For example, the invention relates to glass articles having an ODS normalized with respect to the thickness in a range of 0.001 to 10 nm/µm, of 0.01 to 5 nm/µm or of 0.05 to 2 nm/µm on an area section of $2 \times 2$ mm$^2$. The invention also relates to glass articles having an ODS normalized with respect to the thickness in a range of 0.001 to 10 nm/µm, of 0.01 to 5 nm/µm or of 0.05 to 2 nm/µm on an area section of $5 \times 5$ mm$^2$.

The ODS can also be specified without normalization with respect to the thickness. In this case, the unit "µm" is used and not the unit "nm/µm" as in the case of the ODS normalized with respect to the thickness. When a normalization with respect to the thickness is not mentioned, then normally the ODS without normalization with respect to the thickness is meant.

In an embodiment, the ODS is less than 10 µm, in particularly less than 5 µm or less than 2 µm on an area section of $2 \times 2$ mm$^2$. In an embodiment, the ODS is less than 10 µm, in particularly less than 5 µm or less than 2 µm on an area section of $5 \times 5$ mm$^2$. Depending on the production method, a certain ODS cannot always be avoided so that the glass article in an embodiment can have an ODS of 0.001 µm or higher, for example of 0.01 µm or higher, in particularly at least 0.05 µm, in particularly on an area section of $2 \times 2$ mm$^2$ or more, for example $5 \times 5$ mm$^2$. For example, the invention relates to glass articles having an ODS in a range of 0.001 to 10 µm, of 0.01 to 5 µm or of 0.05 to 2 µm on an area section of $2 \times 2$ mm$^2$. The invention also relates to glass articles having an ODS in a range of 0.001 to 10 µm, of to 5 µm or of 0.05 to 2 µm on an area section of $5 \times 5$ mm$^2$.

In an embodiment, the maximum location-thickness variation ($ODS_{max}$) is less than 50 μm, in particularly less than 25 μm or less than 10 μm on an area section of 2×2 mm². In an embodiment, the ODS is less than 50 μm, in particularly less than 25 μm or less than 10 μm on an area section of 5×5 mm². Depending on the production method, a certain ODS cannot always be avoided so that the glass article in an embodiment can have an $ODS_{max}$ of 0.005 μm or higher, for example of 0.05 μm or higher, in particularly at least 0.25 μm, in particularly on an area section of 2×2 mm² or more, for example 5×5 mm². For example, the invention relates to glass articles having an $ODS_{max}$ in a range of 0.005 to 50 μm, of 0.05 to 25 μm or of 0.25 to μm on an area section of 2×2 mm². The invention also relates to glass articles having an $ODS_{max}$ in a range of 0.005 to 50 μm, of 0.05 to 25 μm or of 0.25 to 10 μm on an area section of 5×5 mm².

The glass article should allow in a pressure sensor a good and, first and foremost, uniform thermal decoupling of semiconductor and medium to be examined. A uniform thermal decoupling is achieved, when the glass article on an area of 2×2 mm² or more shows a variation of the thermal conductivity of not higher than 0.2 W/(m·K), in particularly of at most 0.15 W/(m·K), of at most 0.1 W/(m·K), of at most 0.05 W/(m·K), of at most 0.02 W/(m·K) or of at most 0.01 W/(m·K), in particularly at room temperature, thus at temperatures in a range of 20° C. to 25° C., for example at 22° C. Preferably, this value applies to the whole glass article. In this context "variation" means the maximum difference of the thermal conductivity, thus the difference between the highest and the lowest thermal conductivity on the corresponding area. In some embodiments, the variation of the thermal conductivity may, for example, be at least 0.0001 W/(m·K) or at least 0.001 W/(m·K), in particularly at room temperature, thus at temperatures in a range of 20° C. to 25° C., for example at 22° C. The measurement of the thermal conductivity may, for example, be conducted with the help of a so-called laser flash method. Here, the method is according to the ASTM E1461, and it calculates the thermal conductivity ($\lambda$) from the measured thermal diffusivity a using the specific thermal capacity ($C_p$) as well as the density ($\rho$):

$$\lambda = \alpha C_p \rho \qquad (1)$$

It is also possible to determine the thermal conductivity at a certain position of the glass article by calculation. At positions without damages the effective thermal conductivity $\lambda_{eff}$ corresponds to the thermal conductivity $\lambda$ of the glass. At positions at which the thermal conduction takes place right through a damage, the effective thermal conductivity can be calculated according to the following formula (2):

$$\lambda_{eff} = \frac{1 + \dfrac{\Delta x}{d}}{1 + \dfrac{\Delta x}{d}\dfrac{\lambda_{glass}}{\lambda_{air}}} \lambda_{glass} \qquad (2)$$

In formula (2) $\lambda_{glass}$ is the thermal conductivity of the glass, $\lambda$ air is the conductivity of air, d is the thickness of the glass article and $\Delta x$ is the extension of the damage in the direction of the thermal conduction. In particularly, the thermal conduction takes place from one of the main sides of the glass article orthogonally right through the glass article to the other main side of the glass article. The conductivity $\lambda_{air}$ is a suitable parameter for the thermal conduction right through a damage, because damages are volumes which are not filled with glass. At temperatures of about room temperature $\lambda_{air}$ is about 0.0262 W/(m·K), and thus it is considerably different from the thermal conductivity of typical glasses which at corresponding temperatures is about 1.0 W/(m·K). According to formula (2) follows that already a damage having an extension of $\Delta x=1$ μm in the direction of the thermal conduction in the case of a thickness d of the glass article of 500 μm leads to a decrease of the thermal conductivity of about 7%.

It has been shown to be advantageous, when a glass article which in the temperature range of 20° C. to 300° C. has a mean coefficient of thermal expansion (CTE) in the range of 2.5 to 11*10⁻⁶/K, in particularly of 3.0 to 9.5*10⁻⁶/K, is used. The CTE is determined according to DIN ISO 7991: 1987.

Preferably, the glass article comprises a number of gaseous inclusions of less than 1.0 per mm³.

Viscosity-Temperature Profile

The present invention is not limited in that only glasses with a certain viscosity-temperature profile would be suitable for the glass articles of the invention. However, certain viscosity-temperature properties have shown to be advantageous. For a particularly economic production, in particularly glasses are preferred which can well be produced in drawing methods, e.g., in down draw methods or overflow fusion methods, thus in particularly such glasses, the liquidus viscosity of which above which crystals can be formed has a value of higher than or equal to 10³ dPas, preferably higher than 10³·⁵ dPas, particularly preferably of higher than 10⁴ dPas.

It is particularly advantageous for reducing the location-thickness variation if the glass has such a viscosity-temperature profile that the viscosity is comparably large at temperatures at which the glass melt emerges from the tank in down draw of overflow fusion processes. Furthermore, it is advantageous if the glass has such a viscosity-temperature profile that the increase of viscosity with lowering temperature is comparably steep. Either of the measures individually or in combination substantially reduces the susceptibility of the glass to develop substantial location-thickness variations.

Normally, the Vogel-Fulcher-Tammann equation (VFT equation) is used for calculating the temperature which is necessary for achieving a certain viscosity of the glass (see also DIN ISO 7884-2:1998-2):

$$\lg \eta = A + \frac{B}{T - T_0}$$

In the VFT equation $\eta$ is the viscosity, A and B are parameters of the material which are independent of the temperature, T is the temperature and $T_0$ is the Vogel temperature. For a given glass, A, B and $T_0$ are constant.

Preferably, the glass has a value for B of at least 3500 K, at least 4000 K or at least 4500 K. In particularly preferred embodiments the glass has a value for B of at least 5000 K, at least 5500 K or at least 6000 K. Preferably, B is at most 12000 K, at most 11000 K, at most 10500 K, at most 10000 K, at most 9500 K, or at most 9000 K. The parameter B may for example be in a range of from 3500 to 12000 K, from 4000 to 11000 K, from 4500 to 10500 K, from 5000 to 10000 K, from 5500 to 9500 K, or from 6000 to 9000 K.

$T_0$ is preferably at least 25° C., at least 50° C., at least 75° C., at least 100° C. or at least 120° C. Preferably, $T_0$ is at most 300° C., at most 275° C. or at most 250° C. or at most 225° or at most 215° C. $T_0$ may for example be in a range of from 25° C. to 300° C., from 50° C. to 275° C., from 75° C. to 250° C., from 100° C. to 225° C., or from 120° C. to 215° C.

The value for A is preferably lower than 0, lower than −0.5, lower than −0.75, lower than −1.0 or lower than −1.5. The value for A is preferably at least −5.5, at least −5.0 or at least −4.5. The value for A may for example be in a range of from −5.5 to <0, from −5.5 to <−0.5, from −5.0 to <−0.75, from −4.5 to <−1.0, or from −4.5 to <−1.5.

Glasses with these VFT constants can particularly well be produced in drawing methods, e.g., in down draw methods or overflow fusion methods.

Particularly preferably, the glass has the following VFT constants: A is in a range of −5.5 to <0.0, B is in a range of 3500 to 12000 K and/or $T_0$ is in a range of 25° C. to 300° C. Still more preferably, the glass has the following VFT constants: A is in a range of −5.0 to <−0.75, B is in a range of 4000 to 10000 K and/or $T_0$ is in a range of 75° C. to 275° C. Still more preferably, the glass has the following VFT constants: A is in a range of −4.5 to <−1.5, B is in a range of 4500 to 9000 K and/or $T_0$ is in a range of 120° C. to 250° C. Still more preferably, the glass has the following VFT constants: A is in a range of from −4.5 to lower than −1.5, B is in a range of from 5000 to 10000 K and/or $T_0$ is in a range of from 100° C. to 225° C. This particularly advantageous for achieving a steep increase to viscosity with lowering temperature so that the susceptibility for developing substantial location-thickness variations is reduced.

Even more relevant is the viscosity of the glass melt at the point at which it emerges from the tank. This viscosity is determined by two independent factors, at the one hand by the temperature at which the glass melt emerges from the tank and at the other hand by the glass composition. The first factor is a process parameter that can be chosen accordingly by the skilled person. For example, if the viscosity of the glass melt at the relevant point is too low, the skilled person may choose a reduced temperature in order to increase the viscosity. However, this is reasonably done only within certain limits. Therefore, it is advantageous if the glass has such a composition that the viscosity at a relevant temperature is comparably high. In particular, it is advantageous if the glass has a viscosity 11 according to the VFT equation at T=1400° C. of $10^{2.20}$ dPas or more, $10^{2.30}$ dPas or more, $10^{2.40}$ dPas or more, $10^{2.50}$ dPas or more, $10^{2.60}$ dPas or more, $10^{2.70}$ dPas or more, $10^{2.80}$ dPas or more, $10^{2.90}$ dPas or more, $10^{300}$ dPas or more, $10^{3.10}$ dPas or more, $10^{3.20}$ dPas or more, or $10^{3.30}$ dPas or more. The viscosity $\eta$ at T=1400° C. according to the VFT equation may for example be at most $10^{4.00}$ dPas, at most $10^{3.90}$ dPas, at most $10^{3.80}$ dPas, at most $10^{3.70}$ dPas, at most $10^{3.60}$ dPas, or at most $10^{3.50}$ dPas. The viscosity $\eta$ at T=1400° C. according to the VFT equation may for example be in a range of from $10^{2.20}$ dPas to $10^{4.00}$ dPas, from $10^{2.30}$ dPas to $10^{4.00}$ dPas, from $10^{2.40}$ dPas to $10^{3.90}$ dPas, from $10^{2.50}$ dPas to $10^{3.90}$ dPas, from $10^{2.60}$ dPas to $10^{3.80}$ dPas, from $10^{270}$ dPas to $10^{380}$ dPas, from $10^{2.80}$ dPas to $10^{3.70}$ dPas, from $10^{2.90}$ dPas to $10^{3.70}$ dPas, from $10^{3.00}$ dPas to $10^{3.60}$ dPas, from $10^{3.10}$ dPas to $10^{3.60}$ dPas, from $10^{3.20}$ dPas to $10^{3.50}$ dPas, or from $10^{3.30}$ dPas to $10^{3.50}$ dPas.

In view of the VFT equation as indicated above, it can be seen that an increase of A, an increase of B and/or an increase of $T_0$ is associated with increased viscosity $\eta$ at a given temperature T. However, increased values of A and/or B are also associated with less steep viscosity changes in relevant temperature ranges.

Therefore, it is advantageous if the components of the glass are chosen in a balanced way such that the desired viscosity-temperature profile is obtained. For example, components having a decreasing effect on certain VFT constant are preferably balanced by components having an increasing effect on the respective VFT constant or on one of the other two VFT constants and vice versa so that optimized viscosity-temperature profiles are obtained.

The selection of the glass constituents influences the temperature dependence of the refractive index. For example, the addition of $SiO_2$ decreases the value A and increases the values B and $T_0$ of the VFT equation. The following table summarizes the influence of the glass constituents onto the VFT constants, wherein "+" represents an increasing effect, "++" means that the value of the mentioned constant is increased strongly. "−" represents a decreasing effect; "−−" means that the value of the considered constant is decreased strongly by an increase of the amount of the glass constituent.

|  | A | B | $T_0$ |
|---|---|---|---|
| $Na_2O$ | ++ | −− | − |
| $K_2O$ | − | − | −− |
| CaO | −− | − | ++ |
| MgO | −− | ++ | −− |
| $Al_2O_3$ | ++ | + | ++ |
| $SiO_2$ | −− | ++ | ++ |

Preferred Glass Compositions

The composition of the glass article is not limited to certain glasses. However, for a particularly economic production glasses are preferred which can well be produced in drawing methods, e.g., in down draw methods or overflow fusion methods. In an embodiment, the glass is a silicate glass, in particularly a borosilicate glass or aluminosilicate glass. Moreover, keeping the glass composition in certain limits may be particularly advantageous for optimizing the viscosity-temperature profile so that the susceptibility of the glasses for developing location-thickness variations is reduced. This is particularly the case for glasses having a comparably high viscosity at the point at which the glass leaves the tank and/or having a steep increase of the viscosity with lowering temperature.

With the help of the glass composition, for example, the thermal conductivity (in W/(m·K)) and thus also the coefficient of thermal transmittance (in W/(m²·K)) can be influenced. Certain oxides, such as for example $SiO_2$, $Al_2O_3$, $B_2O_3$, MgO, CaO, SrO, BaO or $K_2O$, are connected with an increase of the thermal conductivity. Other oxides, such as for example $TiO_2$, $Li_2O$ or $Na_2O$, are connected with a decrease of the thermal conductivity.

In the present disclosure, the sum of the alkali metal oxides, in particularly the sum $Li_2O+Na_2O+K_2O$ is also referred to as "$R_2O$". Similarly, the sum $MgO+CaO+SrO+BaO+ZnO$ is also referred to as "RO".

In an embodiment, the glass comprises at least 60.0% by mol of $SiO_2$. Optionally, the content of $SiO_2$ can be up to 87.0% by mol or up to 85.0% by mol. Silicon dioxide makes a substantial contribution to the resistance of the glass. But it also increases the processing temperature of the glass and thus reduces the economy of the production. In an embodiment, the glass comprises at least 67.0% by mol or at least 75.0% by mol of $SiO_2$, more preferably at least 77.5% by mol, more preferably at least 80.0% by mol.

In some embodiments, an optional component in the glass is $B_2O_3$.

For example, the glass may contain the following components in the specified portions in % by mol.

|  | Min. (% by mol) | Max. (% by mol) |
| --- | --- | --- |
| $SiO_2$ | 60.0 | 87.0 |
| $B_2O_3$ | 0.0 | 15.0 |
| $Al_2O_3$ | 0.0 | 12.0 |
| $R_2O$ | 0.0 | 20.0 |

Glass articles comprising, or produced from a glass comprising the following components in % by weight, have shown to be particularly preferred for the provision of a glass article according to embodiments and/or producible in a method according to embodiments.

Composition Range 1:

| $SiO_2$ | 60 to 65 |
| --- | --- |
| $B_2O_3$ | 6 to 10.5 |
| $Al_2O_3$ | 14 to 25 |
| MgO | 0 to 3 |
| CaO | 0 to 9 |
| BaO | 3 to 8 |
| ZnO | 0 to 2, | wherein the following is true: the sum of the content of MgO, CaO and BaO is characterized in that it is in the range of 8 to 18% by weight.

Composition Range 2:

| $SiO_2$ | 60 to 85 |
| --- | --- |
| $B_2O_3$ | 5 to 20 |
| $Al_2O_3$ | 2 to 15 |
| $Na_2O$ | 3 to 15 |
| $K_2O$ | 3 to 15 |
| ZnO | 0 to 12 |
| $TiO_2$ | 0.5 to 10 |
| CaO | 0 to 0.1 |

Composition Range 3:

| $SiO_2$ | 75 to 85 |
| --- | --- |
| $B_2O_3$ | 8 to 15 |
| $Al_2O_3$ | 2 to 4.5 |
| $Na_2O$ | 1.5 to 5.5 |
| $K_2O$ | 0 to 2 |

Composition Range 4:

| $SiO_2$ | 20 to 70, preferably 50 to 60, particularly preferably 52 to 58 |
| --- | --- |
| $B_2O_3$ | 0.5 to 14, preferably 2 to 12, particularly preferably 2 to 4 |
| $Al_2O_3$ | 15 to 41, preferably 16 to 24, particularly preferably 18 to 23 |
| MgO | 0.5 to 15, preferably 2 to 12, particularly preferably 3 to 5 |
| CaO | 0 to 5, preferably 0 to 3 |
| BaO | 0 to 7, preferably 0 to 6 |
| ZnO | 0 to 20, preferably 2 to 12, particularly preferably 8 to 10 |
| $Na_2O$ | 0 to 7, preferably 1 to 6, particularly preferably 3 to 5 |

Composition Range 5:

| $SiO_2$ | 50 to 81 |
| --- | --- |
| $B_2O_3$ | 0 to 5 |
| $Al_2O_3$ | 0 to 5 |
| $R_2O$ | 5 to 28 |
| RO | 5 to 25 |
| $TiO_2 + ZrO_2$ | 0 to 6 |
| $P_2O_5$ | 0 to 2 |

Composition Range 6:

| $SiO_2$ | 52 to 66 |
| --- | --- |
| $B_2O_3$ | 0 to 8 |
| $Al_2O_3$ | 15 to 25 |
| $R_2O$ | 4 to 30 |
| RO | 0 to 6 |
| $TiO_2 + CeO_2$ | 0 to 2.5 |
| $ZrO_2$ | 0 to 2.5 |

In all above-mentioned composition ranges, minor constituents and/or traces, e.g., in the form of coloring substances and/or refining agents, thus for example $SnO_2$, $CeO_2$, $As_2O_3$, $Cl^-$, $F^-$, sulfates, may further be contained.

Generally, without limitation to the embodiments described here, it may be advantageous, when the glass has such a form that it is anodically combinable (or bondable). For this it can be advantageous, when the glass comprises a certain portion of alkalis and/or alkali oxides, in particularly sodium and/or sodium oxide. In such embodiments, the content of $Na_2O$ should be at least 0.5% by weight, but preferably it should not exceed 6% by weight.

In addition, for the use of a glass for pressure sensors, the mean coefficient of thermal expansion is relevant. It has been shown to be advantageous to use a glass article which has in the temperature range of 20° C. to 300° C. a mean coefficient of thermal expansion (CTE) in the range of 2.5 to $11*10^{-6}$/K, in particularly of 3.0 to $9.5*10^{-6}$/K. The CTE is determined according to DIN ISO 7991:1987. In certain embodiments of the invention, it is in the range of 3.1 to 3.3 ppm/K, which corresponds to the coefficient of expansion of silicon.

At best, at all temperatures in the temperature interval 20-400° C., the relative change in length $\Delta L/L$ is similar to the course of silicon, at best it is congruent.

Production Method

Glass articles of this invention can, for example, be prepared by drawing methods. Exemplary drawing methods are down draw, overflow fusion and redrawing. Down draw and/or overflow fusion are particularly preferred.

Depending on the surface quality, post-processing may be required. Exemplary post-processing steps are polishing, grinding and lapping. Particularly advantageous are grinding and optionally subsequent polishing. Grinding with bonded grain, in particularly with a diamond abrasive, is particularly preferred.

Typically, with drawing methods glass articles are obtained which are already characterized by a very good near-surface level of damage. But, without further targeted measures, drawn glasses can have a high ODS. Glass articles which are produced not in drawing methods, but in casting methods as ingots and are subsequently sawed and polished, often have very low ODS, but a high degree of near-surface damages. In methods according to this invention, measures have been taken for providing glasses which are characterized by both a low ODS and also a low ONSL, and thus they are particularly well suitable as component parts in pressure sensors. The method described in the following can be operated in a continuous manner, and thus also under economic viewpoints it is advantageous.

In an aspect, the invention relates to a method for the production of glass articles, comprising the steps: producing of a glass melt, refining of the glass melt, drawing of the glass melt, in particularly using drawing rolls, to a glass ribbon having a target thickness in the range of less than 3.0 mm, dividing of the glass ribbon into glass articles, wherein the glass ribbon passes a region Z in which it has already achieved the target thickness, but its viscosity is still below $10^{10}$ dPas, wherein the glass in the region Z is drawn with a drawing speed of at least 0.5 m/min and at most 50 m/min, for example 2 to 10 m/min, 10 to 25 m/min or 25 to 50 m/min, and wherein measures are taken which are suitable for keeping the region Z free from interfering influences in the frequency range of 0.01 to 500 Hz, for example 0.05 to 400 Hz, 0.1 to 300 Hz, 0.5 to 250 Hz, 0.8 to 200 Hz, 1 to 100 Hz, 4 to 75 Hz or 5 to 50 Hz.

In particular, frequencies of 1 Hz or more have been found to be associated with emergence of relevant location-thickness variations. Therefore, measures should be taken which are suitable for keeping the region Z free from interfering influences in the frequency range of 1 to 500 Hz, 2 to 400 Hz, 3 to 300 Hz, 4 to 250 Hz, 5 to 200 Hz, 10 to 100 Hz, 15 to Hz or 20 to 50 Hz. For example, measures can be taken which are suitable for keeping the region Z free from interfering influences with a frequency of at least 1 Hz, at least 2 Hz, at least 3 Hz, at least 4 Hz, at least 5 Hz, at least 10 Hz, at least 15 Hz, or at least 20 Hz. For example, measures can be taken which are suitable for keeping the region Z free from interfering influences with a frequency of at most 500 Hz, at most 400 Hz, at most 300 Hz, at most 250 Hz, at most 200 Hz, at most 100 Hz, at most 75 Hz or at most 50 Hz.

Interfering influences in the mentioned frequency range can, for example, be achieved with an acoustic housing of the drawing facility and/or the region Z. Optionally, already an adjustment of the distances of drawing rolls (in particularly in the drawing direction) can minimize interfering influences in the facility.

Because in this way natural vibrations of the glass can be suppressed. Natural vibrations of the glass in particularly occur at the natural frequency EF of the glass as well as multiples thereof (frequency f=n*EF). By suitable positioning of drawing rolls or rollers, these natural vibrations can be suppressed. For example, between a first drawing roll and the HFG zone (hot forming zone) a second drawing roll can be positioned such that the distance of the second drawing roll to the first drawing roll is selected smaller than 1/n of the distance of the first drawing roll to the HFG zone for suppressing a natural vibration with n*EF.

Relevant natural frequencies can, for example, be assessed according to the following formula, when the glass ribbon is considered as a string:

$$f = \frac{1}{L}\sqrt{\frac{\Psi}{4\mu}}$$

L is the length of the string, $\Psi$ is the tension force and $\mu$ is the mass coverage. When the glass ribbon is considered as a two-dimensional object (membrane instead of string), then further natural frequencies can be determined.

For minimizing interfering influences a vibration decoupling may be provided, in particularly in the range of 0.01 to 500 Hz, for example 0.05 to 400 Hz, 0.1 to 300 Hz, 0.5 to 250 Hz, 0.8 to 200 Hz, 1 to 100 Hz, 4 to 75 Hz or 5 to 50 Hz, or in the frequency range of 1 to 500 Hz, 2 to 400 Hz, 3 to 300 Hz, 4 to 250 Hz, 5 to 200 Hz, 10 to 100 Hz, 15 to 75 Hz or 20 to 50 Hz.

It is advantageous to exclude certain frequency ranges and/or to create detuning to the natural frequencies.

It is also advantageous to mitigate the convection in the cooling region so that the glass is not made to vibrate. This, for example, can be achieved with the help of panels (shielding pressure cascade). Also a sealing may be provided, in particularly an airtight sealing.

Vibrations can also be avoided, when drawing facility and forming are decoupled. So it can be avoided that vibrations are transmitted to the forming.

Drawing of the glass melt may in particular include down draw or overflow fusion. In both cases the glass melt emerges from a tank and is then drawn to a glass ribbon. The viscosity that the glass melt has at the point at which it emerges from the tank is particularly relevant with respect to the emergence of location-thickness variations. Notably, the viscosity should be lower than $10^4$ dPas in order for the glass melt to be properly drawn. However, if the viscosity is too low, the glass ribbon is going to be too long in a viscosity range that makes it susceptible for developing location-thickness variations during drawing. Therefore, the viscosity of the glass melt at the point at which the glass melt emerges from the tank should be $10^{2.20}$ dPas or more, $10^{2.30}$ dPas or more, $10^{2.40}$ dPas or more, $10^{2.50}$ dPas or more, 2.60 dPas or more, $10^{2.70}$ dPas or more, $10^{2.80}$ dPas or more, $10^{2.90}$ dPas or more, $10^{3.00}$ dPas or more, $10^{3.10}$ dPas or more, $10^{3.20}$ dPas or more, or $10^{3.30}$ dPas or more. The viscosity of the glass melt at the point at which the glass melt emerges from the tank may for example be at most $10^{4.00}$ dPas, at most $10^{3.90}$ dPas, at most $10^{3.80}$ dPas, at most $10^{3.70}$ dPas, at most $10^{3.60}$ dPas, or at most $10^{3.50}$ dPas. The viscosity of the glass melt at the point at which the glass melt emerges from the tank may for example be in a range of from $10^{2.20}$ dPas to $10^{4.00}$ dPas, from $10^{2.30}$ dPas to $10^{4.00}$ dPas, from $10^{2.40}$ dPas to $10^{3.90}$ dPas, from $10^{2.50}$ dPas to $10^{3.90}$ dPas, from $10^{2.60}$ dPas to $10^{3.80}$ dPas, from $10^{2.70}$ dPas to $10^{3.80}$ dPas, from $10^{2.80}$ dPas to $10^{3.70}$ dPas, from $10^{2.90}$ dPas to $10^{3.70}$ dPas, from $10^{3.00}$ dPas to $10^{3.60}$ dPas, from $10^{3.10}$ dPas to $10^{3.60}$ dPas, from $10^{3.20}$ dPas to $10^{3.50}$ dPas, or from $10^{3.30}$ dPas to $10^{3.50}$ dPas.

The viscosity of the glass melt at the point at which it emerges from the tank is mainly determined by two independent factors, on the one hand by the temperature at which the glass melt emerges from the tank and on the other hand by the glass composition. The first factor is a process parameter that can be chosen accordingly by the skilled person. For example, if the viscosity of the glass melt at the relevant point is too low, the skilled person may choose a reduced temperature in order to increase the viscosity.

It is also advantageous if the viscosity increases steeply after emerging from the tank. The steepness of the viscosity increase can be influenced by the choice of the glass composition and/or by applying a suitable cooling regimen.

In an aspect, the invention relates to a glass article with a thickness of less than 3.0 mm and with an average near-surface level of damage (ONSL) on 2×2 mm$^2$ of less than 2000 damages having an extension of at least 1.0 μm.

In an aspect, the invention relates to a glass article with a thickness of less than 3.0 mm and with an average location-thickness variation (ODS) normalized with respect to the thickness on 2×2 mm$^2$ of less than 10 nm per 1 µm thickness.

In an aspect, the invention relates to a glass article with a thickness of less than 3.0 mm and with an ODS of less than 10 µm on an area section of 2×2 mm$^2$ or of 5×5 mm$^2$.

In an aspect, the invention relates to a glass article with a thickness of less than 3.0 mm and with an $ONSL_{max}$ on an area section of 2×2 mm$^2$ of at most 4000.

In an aspect, the invention relates to a glass article with a thickness of less than 3.0 mm and with a maximum location-thickness variation ($ODS_{max}$) of less than 50 µm on an area section of 2×2 mm$^2$ or of 5×5 mm$^2$.

In an aspect, the invention relates to a glass article with a thickness of less than 3.0 mm and with a variation of the thermal conductivity of not higher than 0.2 W/(m·K) on an area of 2×2 mm$^2$.

In an aspect, the invention relates to a glass article with a thickness of less than 3.0 mm and with a viscosity-temperature profile which is characterized by the following VFT parameters: A is in a range of −5.5 to <0.0, B is in a range of 3500 to 12000 K and/or $T_0$ is in a range of 25° C. to 300° C.

In an aspect, the invention relates to a glass article with a thickness of less than 3.0 mm and with an average near-surface level of damage (ONSL) on 2×2 mm$^2$ of less than 2000 damages having an extension of at least 1.0 µm and with an ODS of less than 10 µm on an area section of 2×2 mm$^2$.

In an aspect, the invention relates to a glass article with a thickness of less than 3.0 mm and with an average near-surface level of damage (ONSL) on 2×2 mm$^2$ of less than 2000 damages having an extension of at least 1.0 µm and with a maximum location-thickness variation ($ODS_{max}$) of less than 50 µm on an area section of 2×2 mm$^2$.

In an aspect, the invention relates to a glass article with a thickness of less than 3.0 mm and with an average near-surface level of damage (ONSL) on 2×2 mm$^2$ of less than 2000 damages having an extension of at least 1.0 µm and with a variation of the thermal conductivity of not higher than 0.2 W/(m·K) on an area of 2×2 mm$^2$.

In an aspect, the invention relates to a glass article with a thickness of less than 3.0 mm and with an average near-surface level of damage (ONSL) on 2×2 mm$^2$ of less than 2000 damages having an extension of at least 1.0 µm and with a viscosity-temperature profile which is characterized by the following VFT parameters: A is in a range of −5.5 to <0.0, B is in a range of 3500 to 12000 K and/or $T_0$ is in a range of 25° C. to 300° C.

In an aspect, the invention relates to a glass article with a thickness of less than 3.0 mm and with an average location-thickness variation (ODS) normalized with respect to the thickness on 2×2 mm$^2$ of less than 10 nm per µm thickness and with an $ONSL_{max}$ on an area section of 2×2 mm$^2$ of at most 4000.

In an aspect, the invention relates to a glass article with a thickness of less than 3.0 mm and with an average location-thickness variation (ODS) normalized with respect to the thickness on 2×2 mm$^2$ of less than 10 nm per µm thickness and with a variation of the thermal conductivity of not higher than 0.2 W/(m·K) on an area of 2×2 mm$^2$.

In an aspect, the invention relates to a glass article with a thickness of less than 3.0 mm and with an average location-thickness variation (ODS) normalized with respect to the thickness on 2×2 mm$^2$ of less than 10 nm per µm thickness and with a viscosity-temperature profile which is character-ized by the following VFT parameters: A is in a range of −5.5 to <0.0, B is in a range of 3500 to 12000 K and/or $T_0$ is in a range of 25° C. to 300° C.

The present invention will now be explained in more detail with the help of the following examples.

Example 1

Glass articles were subjected to various post-processing steps. The example 1A was post-processed with lapping and polishing. The example 1B was post-processed with grind-ing and polishing. In detail, the post-processing protocols were as follows.

| | Lapping | Grinding | Polishing |
|---|---|---|---|
| machine means | SpeedFAM 20B lapping agent with 15 µm grain size (D50) | DGM1500 diamond abrasive with 20 µm grain size + 1% cooling agent with filter water | SpeedFAM 20B feltlike polishing pad & polishing agent with grain size < 2.0 µm (D50) |
| load | 34 g/cm$^2$ | 52 g/cm$^2$ | 34 g/cm$^2$ |
| speed | 30 rotations per minute | 25 rotations per minute | 20 rotations per minute |
| material removal | 350 µm | 100 µm | 10 µm |

In the examples 1A and 1B the same polishing step was conducted. The only difference between both examples is that the example 1A has been subjected to the above-described lapping, while example 1B has been subjected to the above-described grinding.

Figure 3A:
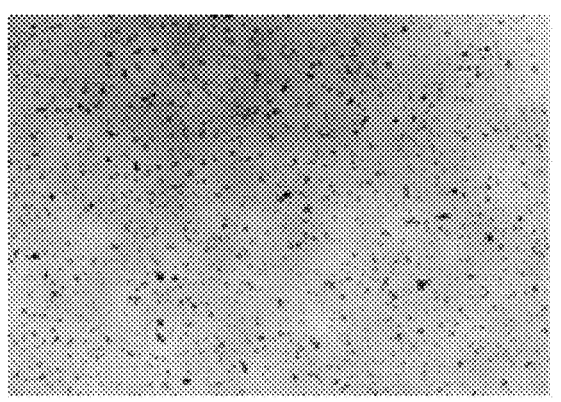
Figure 3A:
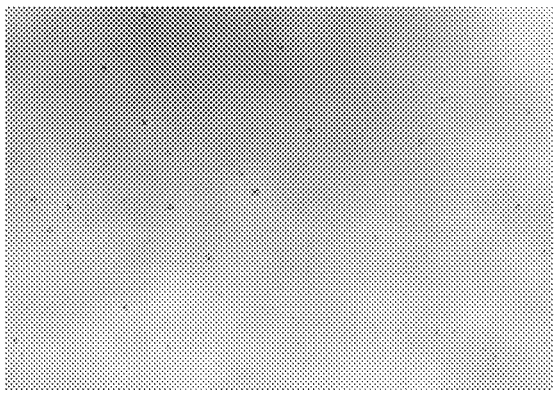

The influence of the different post-processing steps onto the near-surface level of damage (ONSL) was analyzed under a microscope (Zeiss LSM 800) with fortyfold mag-nification with a lighting of 65% of 120 V. Exemplary images are shown in FIGS. 3A and 3B. Each black point was interpreted as one damage. For avoiding miscounting due to contaminations adhering on the surface, before the micro-scopic evaluation the surfaces of the samples were cleaned.

The results are summarized in the following table, wherein as ONSL the average number of the near-surface damages on the specified area is given each. For each of the examples 1A and 1B, 7 samples were examined each.

| | Example 1A | Example 1B |
|---|---|---|
| ONSL on 1 × 1 mm$^2$ | <500 | <50 |
| ONSL on 2 × 2 mm$^2$ | ≥500-2000 | ≥50-100 |
| ONSL on 5 × 5 mm$^2$ | >2000-12000 | >100-600 |
| length of the damages [µm] | <15 | <20 |
| width of the damages [µm] | <10 | <10 |

A comparison of the example 1A with 1B shows that with grinding in comparison to lapping better results (lower extent of ONSL) are achieved.

The nominal thickness of the examples 1A and 1B after the corresponding post-processing was in a range of about 400 µm to about 450 µm each. With the method described in example 2, for area sections of 2×2 mm$^2$ and 5×5 mm$^2$ the location-thickness variation (ODS) was determined. Rel-evant differences of the ODS values between the examples 1A and 1B could not be found.

In the case of the area sections of 2×2 mm$^2$, the average location-thickness variation ($ODS_{avg}$) determined as the arithmetic mean value of the individual ODS, values of the examples 1A and 1B was about 0.05 μm each. Correspondingly, the ODS per nominal thickness on an area section of 2×2 mm² was in a range of 0.11 to 0.13 nm/μm.

In the case of the area sections of 5×5 mm², the average location-thickness variation ($ODS_{avg}$) determined as the arithmetic mean value of the individual ODS, values of the examples 1A and 1B was about 0.13 to 0.14 μm each. Correspondingly, the ODS per nominal thickness on an area section of 5×5 mm² was in a range of 0.27 to 0.34 nm/μm.

Example 2

Glass articles with a nominal thickness of 700 μm or of 250 μm were prepared in a down draw method. The articles had a length of 510 mm and a width of 430 mm each.

The actual site-dependent thickness of the glass articles was determined optically with the help of interference measurements. For this purpose, light is focused onto the glass article and the interference resulting from the path differences of the reflections at the front and back sides of the article is used for determining the local thickness of the glass article.

thickness of d=700 μm (examples "V2-V6") were examined. The number of the area sections considered with (2×2) mm² was 204,408 per glass article and the number of the area sections considered with (5×5) mm² was 202,905 per glass article.

Interestingly it has been found that the determined ODS values in the case of a nominal thickness of 700 μm did not vary within, but greatly varied from trial to trial (V2-V6). In the case of a nominal thickness of 250 μm, however, for different samples no relevant deviations with respect to the ODS values were found. Therefore, in the following, in the case of a nominal thickness of 250 μm only one ODS value is specified, while in the case of a nominal thickness of 700 μm a range is specified, wherein the upper and lower limits thereof respectively correspond to the highest and the lowest ODS avg values of the examined samples of all trials.

The ODS values shown are the average location-thickness variation ($ODS_{avg}$) each, determined as the arithmetic mean value of the individual $ODS_i$ values. For area sections of (2×2) mm² ODS is calculated as mean value of 204,408 $ODS$, values. For area sections of (5×5) mm² ODS is the mean value of 202,905 ODS, values each per trial.

The results are summarized in the following table.

| | V2-V6 (2 × 2) mm² | V2-V6 (5 × 5) mm² | V1 (2 × 2) mm² | V1 (5 × 5) mm² |
|---|---|---|---|---|
| nominal thickness | 700 μm | 700 μm | 250 μm | 250 μm |
| area section considered | (2 × 2) mm² | (5 × 5) mm² | (2 × 2) mm² | (5 × 5) mm² |
| ODS | 0.06 μm to 0.22 μm | 0.23 μm to 0.91 μm | 0.06 μm | 0.18 μm |
| ODS per nominal thickness | 0.09 nm/μm to 0.31 nm/μm | 0.33 nm/μm to 1.30 nm/μm | 0.24 nm/μm | 0.72 nm/μm |

For the measurements a Precitec Sensor Interferometric-K interferometer was used. The sampling rate was 4 kHz. The scanning speed was 500 mm/s. The measuring point interval was 0.125 mm.

Measuring tracks were measured in orthogonal direction to the direction in which the glass has been drawn. The distance between two measuring tracks was 10 mm. Thus, the measured spatial resolution in the direction in which the glass has been drawn was only 10 mm. For increasing the resolution in the direction of drawing, a linear interpolation was performed. As a result, the resolution in the direction in which the glass has been drawn could be increased to 1 mm. The error introduced by the interpolation was estimated to be <0.05 μm. Thus, the interpolation does not lead to relevant deviations of the results.

Based on the thickness values thus obtained, for area sections of 2×2 mm² and 5×5 mm² the location-thickness variation (ODS) was determined. The area sections were selected such that always one of the measuring points was in the center of one area section. Thus, for each of the measuring points one area section was calculated each and evaluated with respect to the ODS. Only those measuring points were exceptions, whose position was too close to the edge of the glass article to serve as a center of an area section of 2×2 mm² or 5×5 mm². With a resolution with respect to the site of 1 mm each in the direction of the drawing of the glass article and orthogonal to the direction of the drawing, this resulted in approximately 200,000 evaluated area sections per glass article.

Figure 4A:
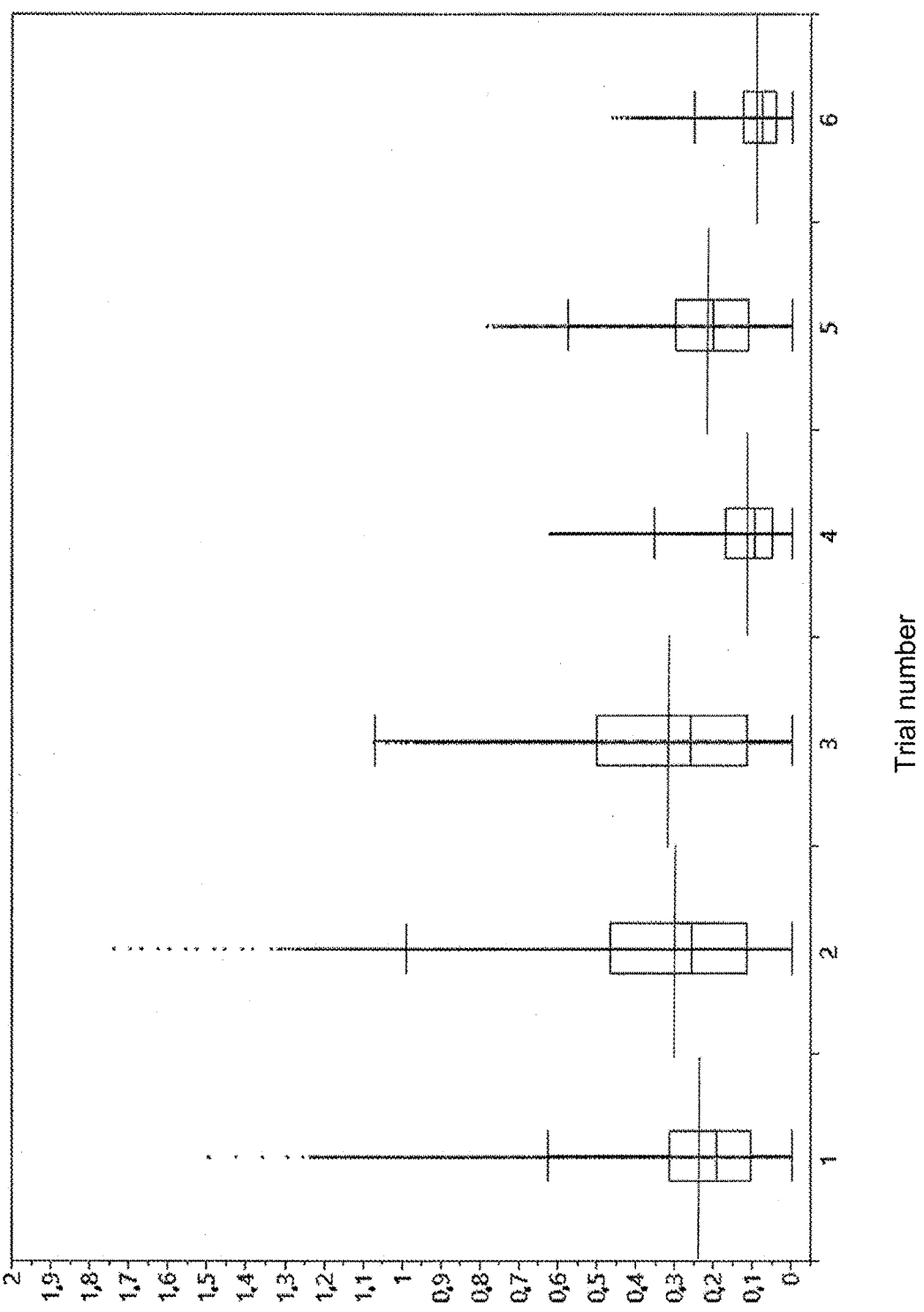
FIGS. 4A and 4B show box plots for the ODS.
Figure 4B:
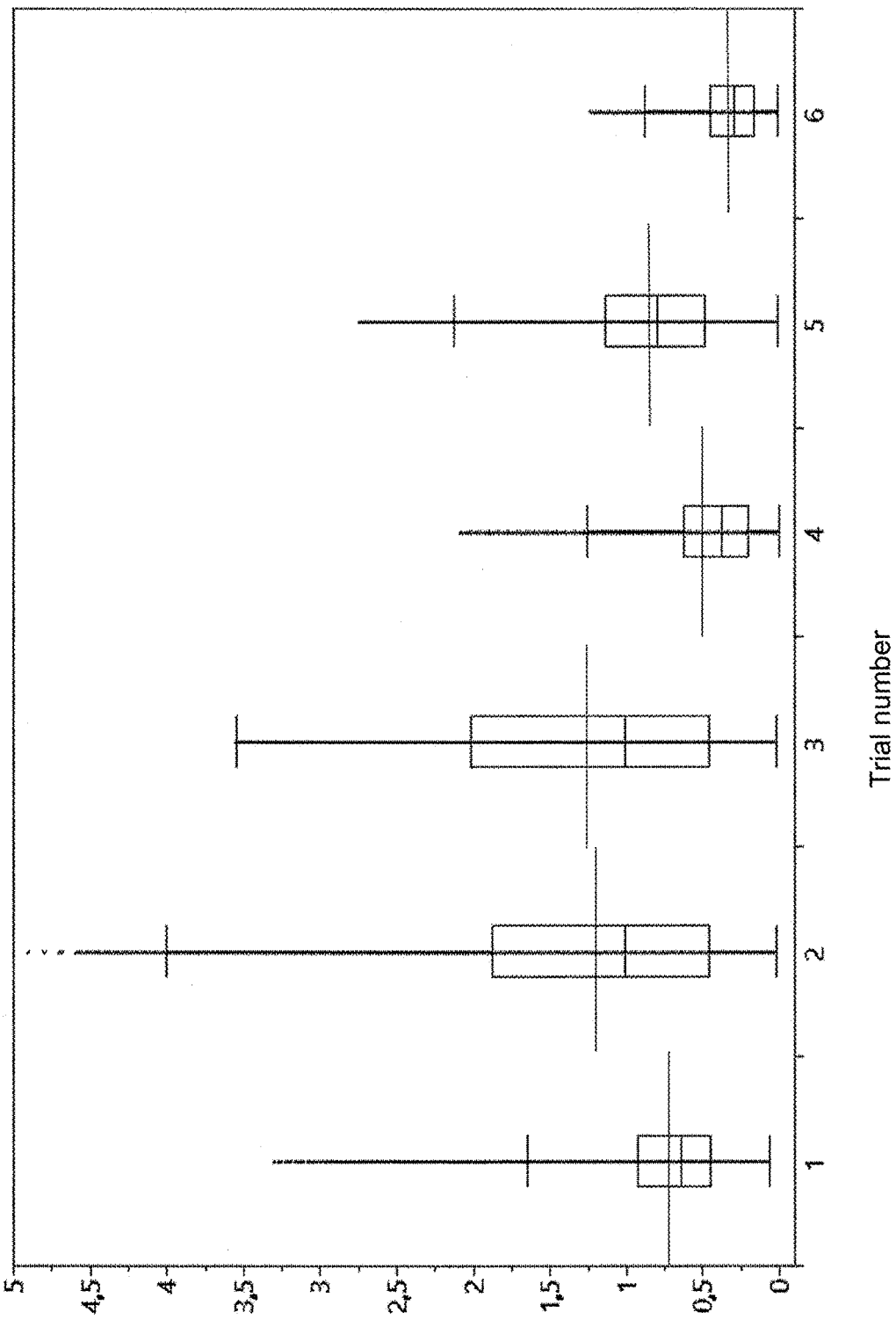

From different trial series (in the following referred to as V1-V6) 4 glass articles with a nominal thickness of 250 μm (example "V1") were examined. In addition, 10 glass articles (2 glass articles per trial each) with a nominal The data on which the above summary is based are shown in FIGS. 4A and 4B in the form of box plots of the $ODS_i$ values per nominal thickness d. Here, FIG. 4A refers to the area sections (2×2) mm² and FIG. 4B refers to the area sections (5×5) mm².

FIG. 1 shows an exemplary pressure sensor in schematic and not true-to-scale view. The pressure sensor is shown in a sectional view and comprises a base 60 which may, for example, be manufactured from a ceramic material. On the base 60 by means of an adhesive layer 63, for example formed from an epoxide resin, a glass element 100 is fixed. The glass element 100 comprises an opening. The pressure sensor comprises as central sensitive unit an MEMS chip 61 manufactured from silicon. In its central region, it comprises a thinned position (filament). The piezoresistive functions are incorporated in this filament. The MEMS chip 61 is anodically bonded to the glass element and forms measuring cavity 600. A reference pressure cavity 601 is formed by a locally thinned component part 62. This component part may be manufactured either of silicon or glass and is hermetically tightly connected with the MEMS chip 61, for example, by anodic bonding or thermal fusion.

Figure 2:
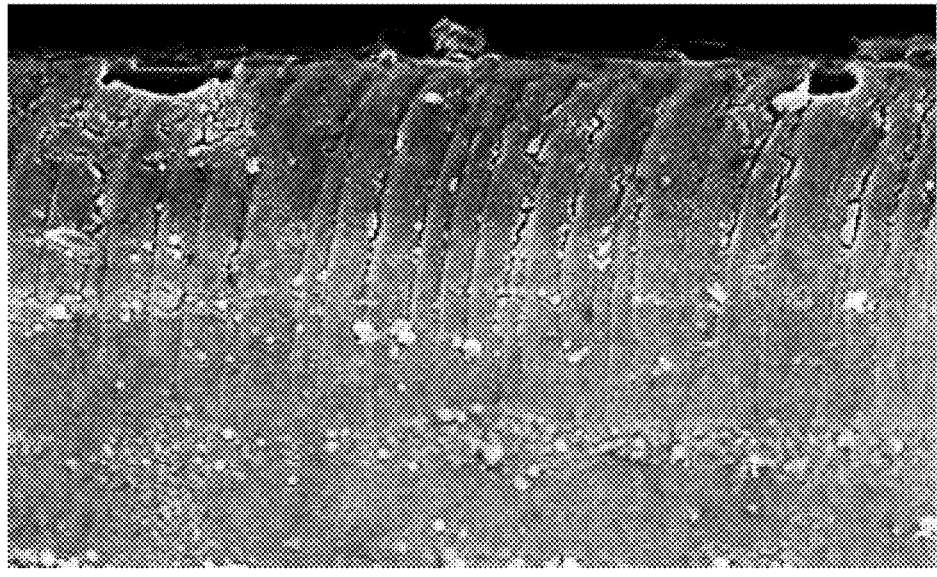
FIG. 2 shows an image of a side view of near-surface damage.

FIG. 2 shows near-surface damages in a side view. The resolution is 1000×.

FIGS. 3A and 3B show exemplary images of samples according to example 1 in fortyfold magnification for the analysis of the near-surface level of damage (ONSL). FIGS. 3A and 3B correspond to a sample of the examples 1A and 1B each. It can be seen that the ONSL in example 1A (FIG. 3A) is higher than in example 1B (FIG. 3B).

FIGS. 4A and 4B show box plots for the ODS, distributions normalized with respect to the nominal thickness d for glass articles prepared in the down draw method with a nominal thickness of 250 μm (V1) and 700 μm (V2-V6) for area sections (2×2) mm² (FIG. 4A) and (5×5) mm² (FIG. 4B). The boxes are each limited by the lower and upper quartiles. The median is shown as a horizontal line within the box. The mean value is shown as a horizontal line extending beyond the lateral limits of the boxes.

What is claimed is:

1. A glass article comprising:

two plane-parallel main sides;

a thickness between the two plane-parallel main sides of less than 3.0 mm;

an average near-surface level of damage (ONSL) on each of the two plane-parallel main sides, the average near-surface level of damage on a specified measuring area that is less than 2000 damages with an extension of less than 1.0 μm, wherein the specified measuring area is 2×2 mm²; and an average location-thickness variation (ODS) normalized with respect to the thickness on the specified measuring area of less than 10 nm per μm thickness of the glass article, wherein the average location-thickness variation (ODS) is a difference between a highest thickness and a lowest thickness within the specified measuring area.

2. The glass article of claim 1, further comprising an average location-thickness variation without normalization is less than 10 μm.

3. The glass article of claim 1, further comprising a maximum location-thickness variation ($ODS_{max}$) on the specified measuring area of less than 50 μm.

4. The glass article of claim 1, further comprising a maximum near-surface level of damage ($ONSL_{max}$) on each of the two plane-parallel main sides, the maximum near-surface level of damage ($ONSL_{max}$) on the specified measuring area is at most 4000 damages having an extension of less than 1.0 μm.

5. The glass article of claim 1, wherein the thickness is less than 2.0 mm.

6. The glass article of claim 1, wherein the thickness is less than 0.5 mm.

7. The glass article of claim 1, further comprising a roughness $R_a$ of less than 2 nm on the specified measuring area.

8. The glass article of claim 1, further comprising a number of gaseous inclusions within the thickness of less than 1.0 per mm³.

9. The glass article of claim 1, wherein the glass article is made of a glass with a viscosity-temperature profile characterized by a parameter of a Vogel-Fulcher-Tammann equation selected from a group consisting of: A in a range of −5.5 to <0.0, B in a range of 3500 to 12000 K, $T_0$ in a range of 25° C. to 300° C., and any combinations thereof.

10. The glass article of claim 1, further comprising a maximum difference of thermal conductivity on the specified measuring area of at most 0.2 W/(m·K).

11. The glass article of claim 1, further comprising an area of the glass article that is at least 400 mm².

12. The glass article of claim 1, further comprising an area of the glass article that is 1 to 10 mm².

13. The glass article of claim 1, further comprising an area of the glass article that is 3 to 6 mm².

14. The glass article of claim 1, wherein the glass article is configured as a pressure sensor component.

15. The glass article of claim 14, further comprising perforations through the thickness.

\* \* \* \* \*